(12) United States Patent
Lechner et al.

(10) Patent No.: US 9,709,152 B2
(45) Date of Patent: Jul. 18, 2017

(54) JOINED MULTIPLE CAM COMPRISING INDIVIDUAL PREFABRICATED CAMS

(75) Inventors: Martin Lechner, Lindlar/Frielingsdorf (DE); Mario Prokop, Neckarsulm (DE); Falk Schneider, Muenchingen (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/548,708

(22) Filed: Jul. 13, 2012

(65) Prior Publication Data

US 2013/0019710 A1    Jan. 24, 2013

Related U.S. Application Data

(62) Division of application No. 11/502,897, filed on Aug. 11, 2006, now abandoned.

(30) Foreign Application Priority Data

Aug. 16, 2005  (DE) ........................ 10 2005 038 656

(51) Int. Cl.
*F16H 53/00* (2006.01)
*F16H 53/02* (2006.01)
*F01L 1/047* (2006.01)

(52) U.S. Cl.
CPC ............ *F16H 53/025* (2013.01); *F01L 1/047* (2013.01); *B23P 2700/02* (2013.01); *F01L 2103/00* (2013.01); *Y10T 74/2101* (2015.01)

(58) Field of Classification Search
CPC  F01L 1/047; F01L 2001/0473; F01L 1/34413
(Continued)

(56) References Cited

U.S. PATENT DOCUMENTS

| | | | |
|---|---|---|---|
| 1,390,949 A | 9/1921 | Yassenoff | |
| 4,522,085 A | 6/1985 | Kane | |

(Continued)

FOREIGN PATENT DOCUMENTS

| | | |
|---|---|---|
| DE | 79 20 957 | 10/1979 |
| DE | 35 31 890 A1 | 3/1986 |

(Continued)

OTHER PUBLICATIONS

German Office Action of German Application No. 10 2005 038 656.3, dated May 29, 2015 with English translation of relevant part.

*Primary Examiner* — Thomas C Diaz
(74) *Attorney, Agent, or Firm* — Collard & Roe, P.C.

(57) ABSTRACT

A joined prefabricated individual cam includes multiple cams for an adjustable camshaft in particular for an internal combustion engine of a motor vehicle. The camshaft has two shafts mounted concentrically one inside the other, namely an inner shaft and an outer shaft. The joined multiple cam is fixedly pinned to the inner shaft via radial openings provided in the outer shaft with a rotatable bearing on the outer shaft. Such a multiple cam has at least one prefabricated individual cam which is placed as a cam ring on the outside circumference of a carrier pipe at an axial distance from the neighboring individual cams and is fixedly connected to this carrier pipe at a predetermined angle of rotation and axial distance assignment.

1 Claim, 10 Drawing Sheets

(58) Field of Classification Search
USPC ........ 74/567, 568 R; 123/90.17, 90.6, 90.27; 29/888.1
See application file for complete search history.

(56) References Cited

U.S. PATENT DOCUMENTS

| | | | |
|---|---|---|---|
| 4,597,365 A | | 7/1986 | Madaffer |
| 4,638,683 A | | 1/1987 | Ogawa et al. |
| 4,708,029 A | | 11/1987 | Urano |
| 4,761,870 A | * | 8/1988 | Urano ........................ 29/421.1 |
| 4,763,614 A | | 8/1988 | Burgio di Aragona |
| 4,809,562 A | | 3/1989 | Bendoraitas et al. |
| 4,835,832 A | | 6/1989 | Arnold et al. |
| 4,967,617 A | * | 11/1990 | Maus et al. ..................... 74/432 |
| 4,993,282 A | | 2/1991 | Swars |
| 5,052,845 A | * | 10/1991 | Maus et al. ..................... 403/36 |
| 5,081,880 A | | 1/1992 | Swars |
| 5,165,303 A | | 11/1992 | Riemscheid et al. |
| 5,165,304 A | | 11/1992 | Swars |
| 5,235,939 A | | 8/1993 | Levin et al. |
| 5,307,768 A | | 5/1994 | Bier et al. |
| 5,664,463 A | | 9/1997 | Amborn et al. |
| 5,704,743 A | * | 1/1998 | Goorsenberg ........ B23B 51/102 408/159 |
| 5,729,899 A | * | 3/1998 | Kaywood ............ B21D 53/845 29/523 |
| 5,979,386 A | | 11/1999 | Swars |
| 6,591,713 B2 | * | 7/2003 | Jesel ................................ 74/567 |
| 6,725,818 B2 | * | 4/2004 | Methley ..................... 123/90.27 |
| 7,210,440 B2 | * | 5/2007 | Lawrence et al. ........... 123/90.6 |
| 7,958,859 B2 | * | 6/2011 | Methley .................. F01L 1/047 123/90.17 |
| 2007/0034184 A1 | | 2/2007 | Dengler |

FOREIGN PATENT DOCUMENTS

| | | |
|---|---|---|
| DE | 93 20 451.5 | 10/1994 |
| DE | 196 06 732 C2 | 9/1996 |
| DE | 197 57 504 A1 | 7/1999 |
| DE | 299 22 876 U1 | 6/2000 |
| DE | 10 2004 011 586 | 10/2004 |
| DE | 10 2004 009 074 B3 | 7/2005 |
| DE | 10 2005 014 680 A1 | 8/2006 |
| EP | 0643 200 A | 3/1995 |
| EP | 1 362 986 A1 | 11/2003 |
| JP | 62 199 907 A | 9/1987 |
| WO | WO 94/19586 | 9/1994 |
| WO | WO 2006/081788 A1 | 8/2006 |

* cited by examiner

JOINED MULTIPLE CAM COMPRISING INDIVIDUAL PREFABRICATED CAMS

CROSS REFERENCE TO RELATED APPLICATIONS

Applicants claim priority under 35 U.S.C. §120 and 35 U.S.C. 121 because this patent application is a Divisional of U.S. patent application Ser. No. 11/502,897 filed Aug. 11, 2006, and Applicants claim priority under 35 U.S.C. §119 of German Application No. 10 2005 038 656.3 filed Aug. 16, 2005, the disclosures of each of which are incorporated herein by reference.

BACKGROUND OF THE INVENTION

1. Field of the Invention

The invention relates to a joined multiple cam consisting of individual prefabricated cams for an adjustable camshaft in particular.

2. The Prior Art

Joined multiple cams are known from DE 10 2004 009 074 B3. Manufacturing of these cams is complicated.

SUMMARY OF THE INVENTION

The invention relates to the problem of designing multiple cams composed of individual cams so they can be manufactured more easily, in particular with respect to multiple cams for adjustable camshafts. These adjustable camshafts are those which consist of two shafts mounted concentrically one inside the other, namely an inner shaft and an outer shaft whereby a generic multiple cam is mounted rotatably on the outer shaft and is rigidly pinned to the inner shaft via a radial opening in the outer shaft.

This object is achieved with a generic multiple cam through a design according to the present invention.

Advantageous and expedient embodiments are the subject matter of the present invention.

In particular in the case of multiple cams for an adjustable camshaft in which the multiple cams are pinned to an inner shaft in the manner described above, the present invention offers the advantage of being able to perform the pinning exclusively within an area of the carrier pipe. In such an embodiment, the material of the camshafts, which is designed for high stresses, may be limited to these elements, whereas the areas of the multiple cam which serve on the one hand as spacers between the individual cams and on the other hand as abutments for the pinning may be made of another material, in particular a material that can be made available less expensively.

BRIEF DESCRIPTION OF THE DRAWINGS

A number of alternative embodiments of the invention are depicted in the drawing.

The diagrams in these drawings show:

FIGS. 1 through 10: each shows different embodiment in a perspective view (FIGS. 1a through 10a), a longitudinal section (FIGS. 1b through 10b taken along the respective lines 1b-1b through 10b-10b in FIGS. 1a through 10a respectively), and a front view (FIGS. 1c through 10c) of a multiple cam.

DETAILED DESCRIPTION OF THE PREFERRED EMBODIMENTS

In all embodiments, the respective multiple cam comprises two individual cams, namely a first individual cam 1 and a second individual cam 2, which are joined together in different axial positions with a fixed rotational angle via a carrier pipe 3. In the following description of the individual embodiments, each of which will be allocated to the diagram in one of the figures, reference will be made to these elements using the same reference numerals. If these elements are different in design, these different embodiments will each be characterized with different indices while otherwise using the same reference numeral.

All the multiple cams illustrated in the drawing and described below are intended primarily for an adjustable camshaft (not shown in the drawing) in which they are mounted on an outer shaft and are fixedly pinned to an inner shaft situated coaxially inside this outer shaft. The areas in which the shaft is pinned via a pin 4, shown here as an example only in individual exemplary embodiments, are situated between the individual cams 1, 2 in an area of a carrier pipe 3.

Figure 1A:
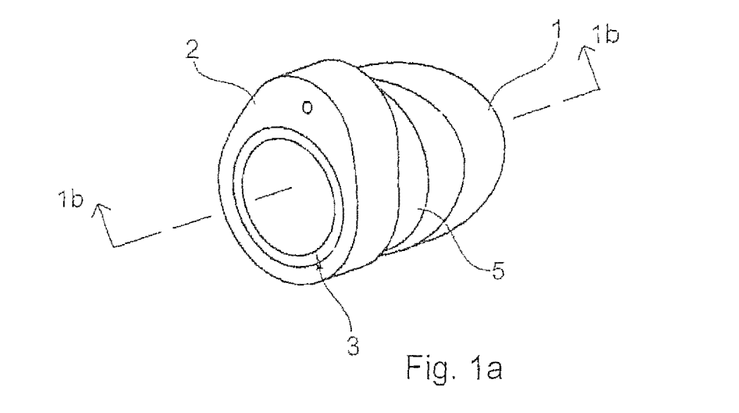
Figure 1B:
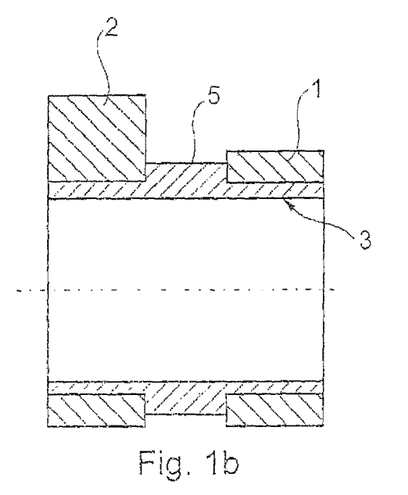
Figure 1C:
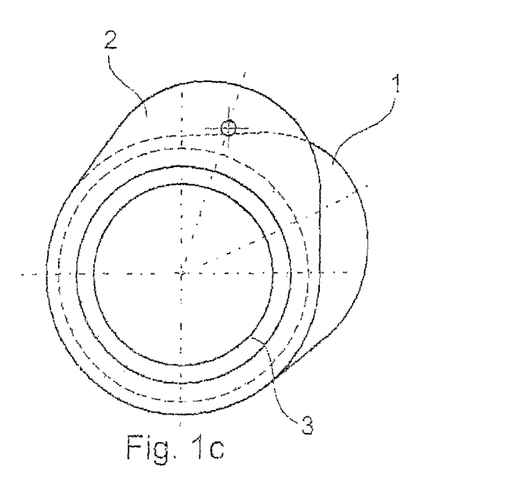

Description of the Individual Embodiments with Correlation to the Respective Figure FIGS. 1a, 1b, and 1c Two individual cams 1, 2 are joined together by a carrier pipe 3. At the axial center of this carrier pipe 3 there is a ring collar 5 protruding axially outward. A individual cam 1, 2 is placed on the end areas of the carrier pipe 3 which have a smaller diameter and each of which has a circular outside, and the individual cam is fixedly connected to the carrier pipe 3 by a press fit. The press fit may be reinforced by an adhesive bond between the individual cams 1, 2 and the carrier pipe 3. The axial distance between the individual cams 1, 2 is determined by the ring collar 5. As in all the embodiments described below, after finishing machining the individual cams 1, 2 may be mounted on the carrier pipe 3 with predetermined angles of rotation so that such a multiple cam can be placed on the outer shaft of an adjustable camshaft in a finished machine form and then in the ideal case need not be reworked anymore. Different materials may be used for the individual cams 1, 2 on the one hand and the carrier pipe 3 on the other hand. The individual cams 1, 2 may also be made of different materials if different operating stresses act on the camshaft for these individual cams 1, 2.

Figure 8A:
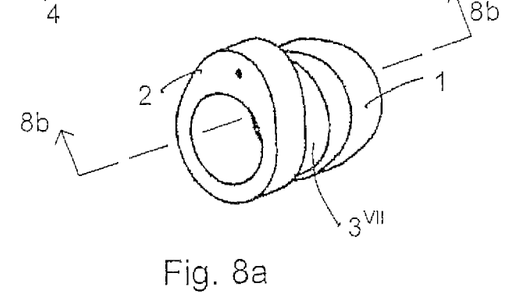
Figure 8B:
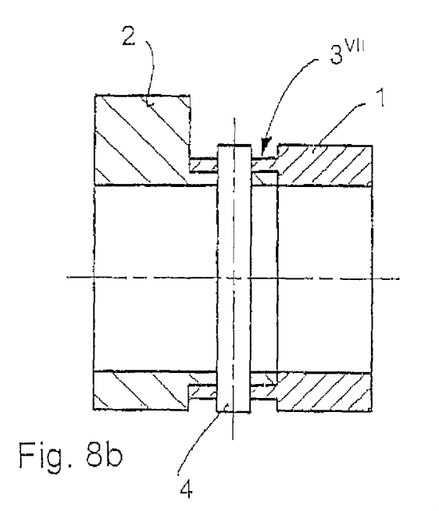
Figure 8C:
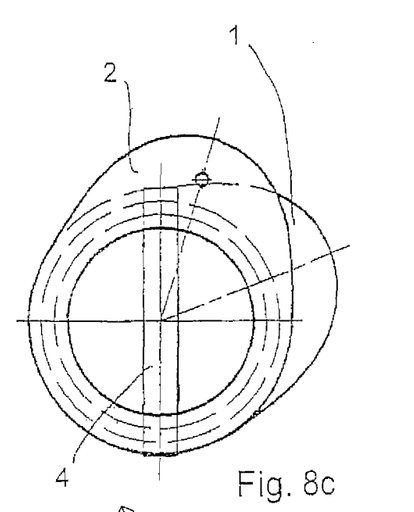

For mounting such a multiple cam, which is mounted on the outer shaft in the case of an adjustable camshaft, the multiple cam may be pinned to the inner shaft radially through the area of the ring collar 5. Such a type of pinning is illustrated in FIGS. 8a, 8b, and 8c in particular.

Figure 2A:
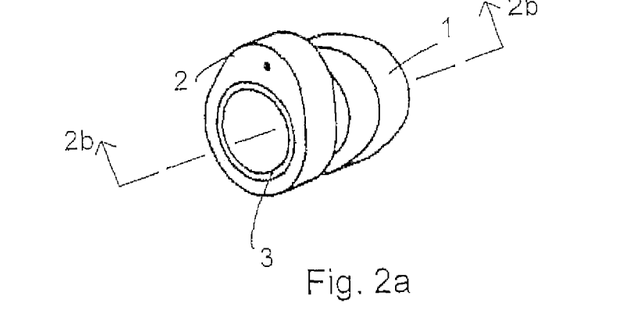
Figure 2B:
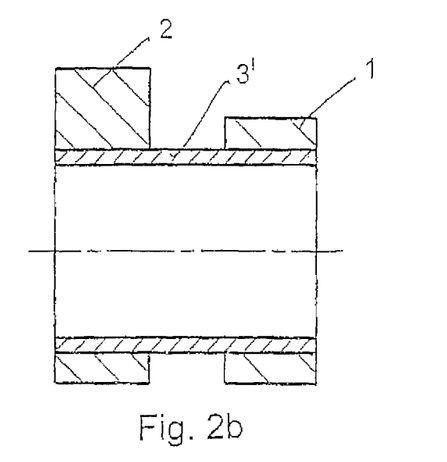
Figure 2C:
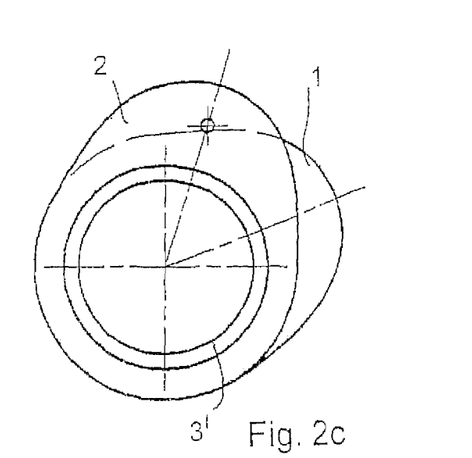

FIGS. 2a, 2b, and 2c

This embodiment differs from that according to FIGS. 1a, 1b, and 1c essentially in that the carrier pipe 3' does not have an outer ring collar 5. In addition it should be pointed out in particular with respect to this exemplary embodiment that the mounting of the individual cams 1, 2 on the carrier pipe 3, 3' or all the other carrier pipe embodiments described below in any desired type of connection may consist of the possibilities with which those skilled in the art are familiar. Alternately or cumulatively, the individual cams 1, 2 may be connected to the carrier pipe in a press fit by welding, soldering, gluing and/or by a form-fitting connection.

FIGS. 3a, 3b, 3c, and 3d

Figure 3A:
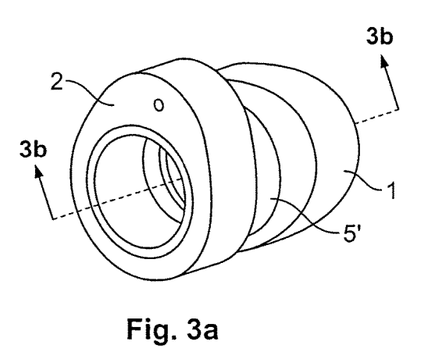
Figure 3B:
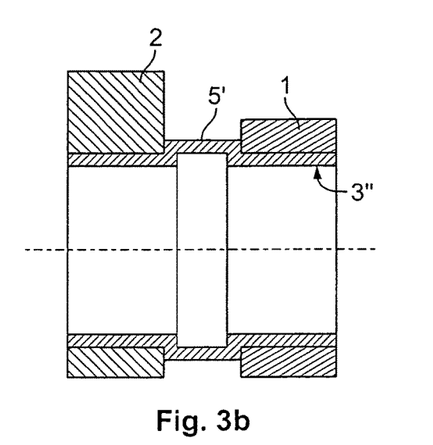
Figure 3C:
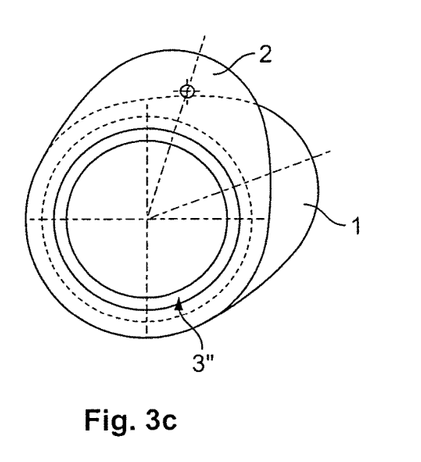

In this embodiment, a carrier pipe 3" is used, its outer ring collar 5' being shaped out of the carrier pipe 3 by molding the carrier pipe 3" in a high-pressure internal molding process, for example. In the area of the ring collar 5', the carrier pipe 3" has an inside circumferential area where the diameter is widened. In the case when such a multiple cam is pinned to the inner shaft of a camshaft, such a widened inside diameter area has the advantage that when joining the multiple cam on the outer shaft of an adjustable camshaft, a manufacturing-related burr on the inside circumference of the ring collar 5 cannot have an interfering effect on the radial bore in the ring collar 5' through which the pinning may be accomplished. Because of the advantage of an inside circumferential area of a ring collar 5 having a widened diameter, as mentioned last, such a carrier pipe design may also be provided by machining a carrier pipe 3 out of solid material.

Figures 4A, 4B, 4C:
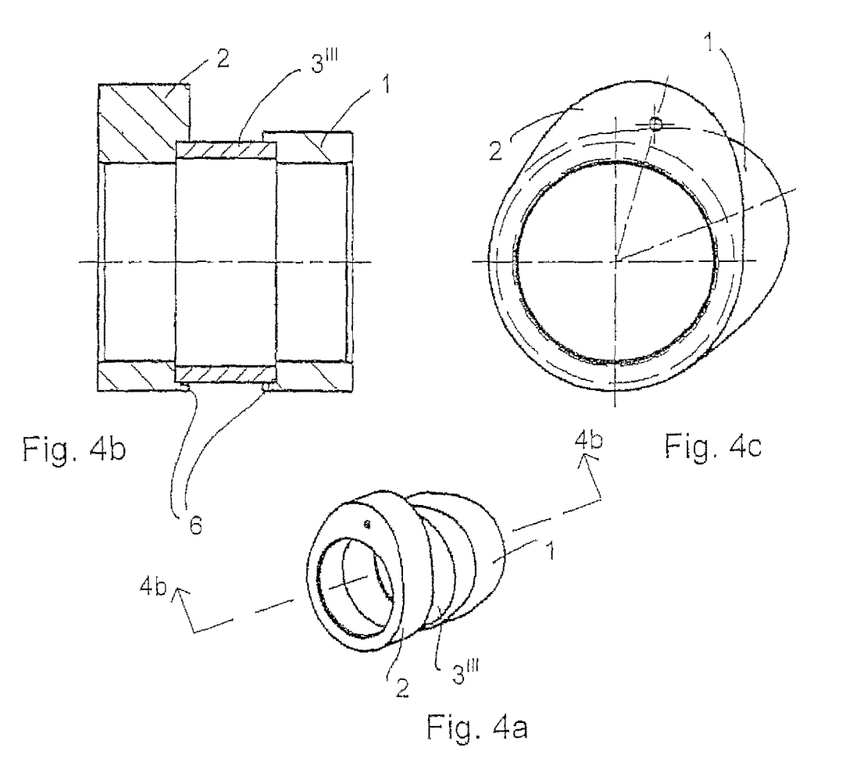

FIGS. 4a, 4b, and 4c

In this embodiment, a carrier pipe 3''' does not pass through the internal circumferential areas of the individual cams 1, 2. This carrier pipe 3''' is instead mounted essentially only axially between the individual cams 1, 2. In the individual cams 1, 2 ring grooves 6 that are open toward the inside radially are provided on the inside edge of each adjacent end face. In the area of these ring grooves 6, the individual cams 1, 2 each extend beyond the carrier pipe 3''' in the respective areas of the ring grooves 6. The connection between the individual cams 1, 2 and the carrier pipe 3''' may be established in the usual way alternatively or cumulatively by welding, soldering, gluing or providing a press fit.

Figure 5A:
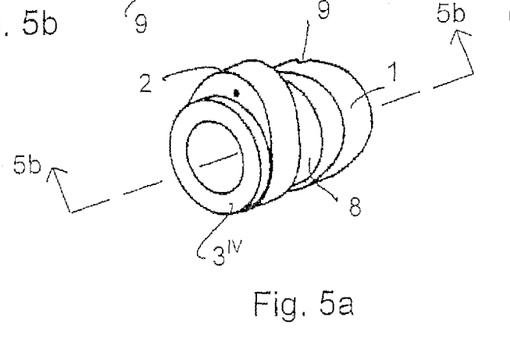
Figure 5B:
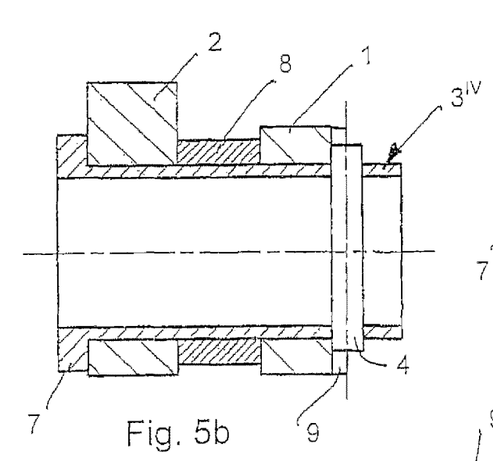
Figure 5C:
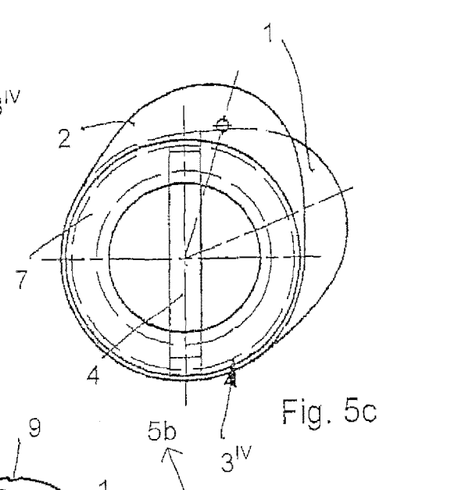

FIGS. 5a, 5b, and 5c

The carrier pipe $3^{IV}$ used here is one which is provided with a ring flange 7 protruding radially outward on one axial end. A spacer ring 8, also placed on the carrier pipe $3^{IV}$, serves to maintain the space between the two individual cams 1, 2 placed on this carrier pipe. On the end of carrier pipe $3^{IV}$ opposite the ring flange 7, a pin may be inserted through radial bores provided there in the carrier pipe $3^{IV}$. The bores for the pin 4 may be arranged in the axial direction of carrier pipe $3^{IV}$ in such a way that they engage in the area of an adjacent first individual cam 1, 2. In this case, the respective individual cam 1, 2 is provided with grooves 9 which run radially and are assigned to the bore for the pin 4. The engagement of the pin 4 in these radial grooves 9 yields a twist-proof form-fitting connection between pin 4 and the adjacent individual cams. Axial bracing of the individual cams 1, 2, including the spacer ring 8, may also be achieved through the pin 4 by means of a corresponding orientation in the axial direction of carrier pipe $3^{IV}$. To achieve a bracing effect in the axial direction of carrier pipe $3^{IV}$, it may be advantageous to provide a temperature difference between the pin 4 and the other elements, in particular the carrier pipe $3^{IV}$, in assembly of the pin 4.

Figure 6A:
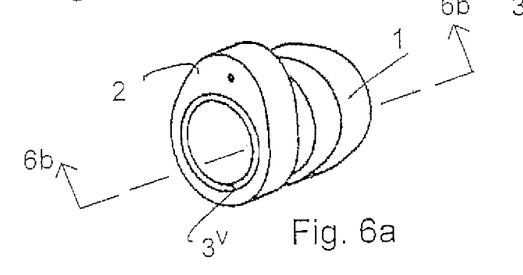
Figure 6B:
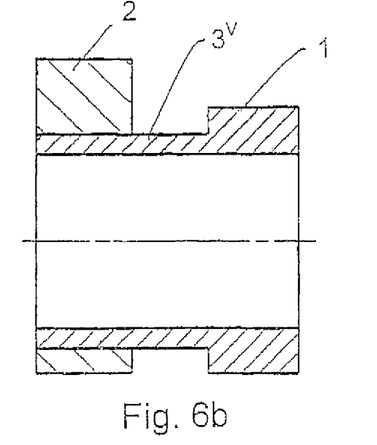
Figure 6C:
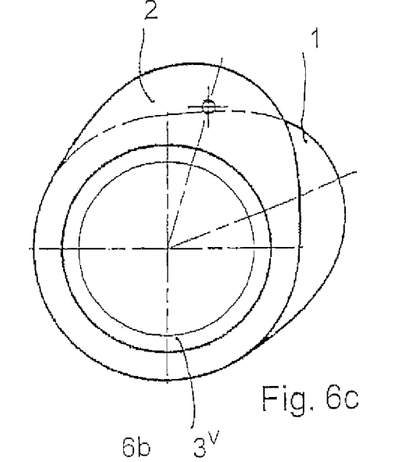

FIGS. 6a, 6b, and 6c

In this embodiment, the carrier pipe $3^{V}$ is part of one of two individual cams 1, 2. Fastening of the individual cam 1 and/or 2, which is not a fixed part, on this carrier pipe $3^{V}$ is accomplished in the manner already described in conjunction with the other exemplary embodiments.

Figure 7A:
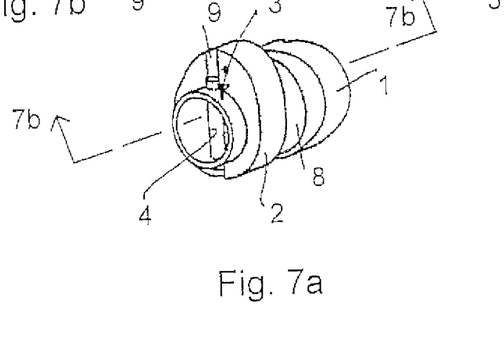
Figure 7B:
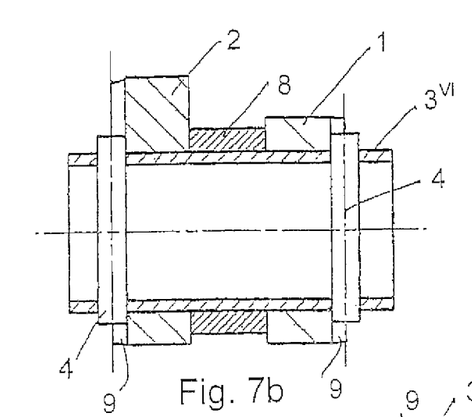
Figure 7C:
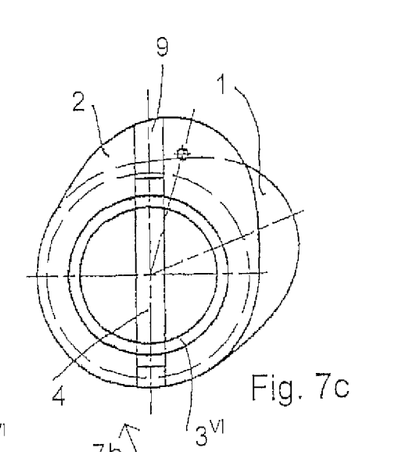

FIGS. 7a, 7b, and 7c

This embodiment of a multiple cam that has been assembled and joined differs from that in FIGS. 5a, 5b, and 5c only in that the carrier pipe $3^{VI}$ here is joined to the individual cams 1, 2 and is designed at both ends in the manner of the embodiment according to FIGS. 5a, 5b and 5c with the help of pin 4.

FIGS. 8a, 8b, and 8c

In this embodiment a part of a carrier pipe $3^{VII}$ is integrally molded on each of the two individual cams 1, 2. The integrally molded parts of the carrier pipe $3^{VII}$ are designed so that they can be telescoped one into the other. In the required pinning to an internal shaft of an adjustable camshaft, the pin 4 may be passed through the telescoping individual areas of the carrier pipe $3^{VII}$. After the pinning has been accomplished, the individual cams 1, 2 are exclusively aligned and secured with respect to one another by this pinning. The two individual areas of the carrier pipe $3^{VII}$ emanating from the individual cams 1, 2 may also be joined together according to one of the options given above for the other types of connection, i.e., in particular they may be joined together by welding, soldering and/or gluing.

Figure 9A:
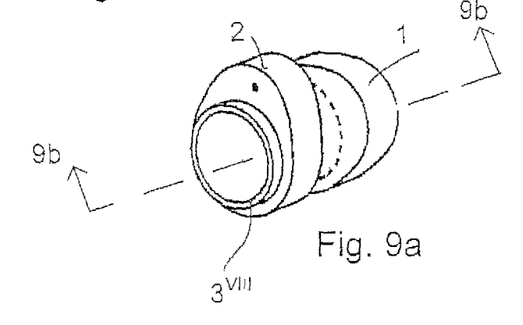
Figure 9B:
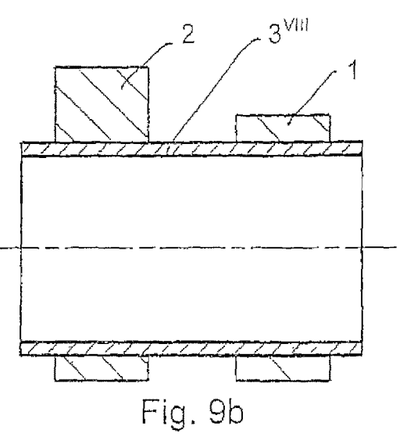
Figure 9C:
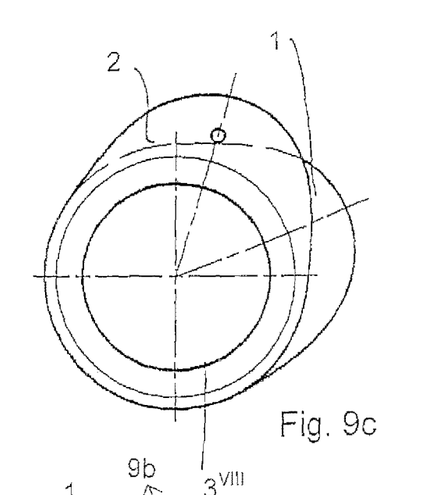

FIGS. 9a, 9b, and 9c

This embodiment variant corresponds to that according to FIGS. 2a, 2b, and 2c with the difference being only that the carrier pipe protrudes axially beyond the individual cams 1, 2 at its ends.

Figure 10A:
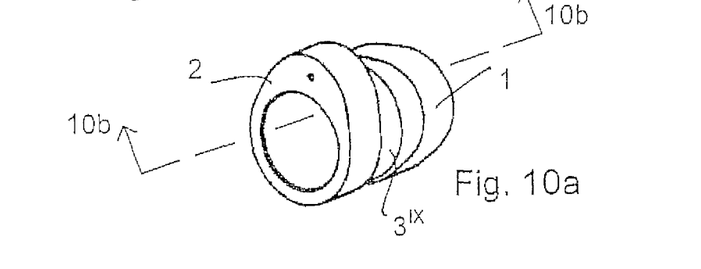
Figure 10B:
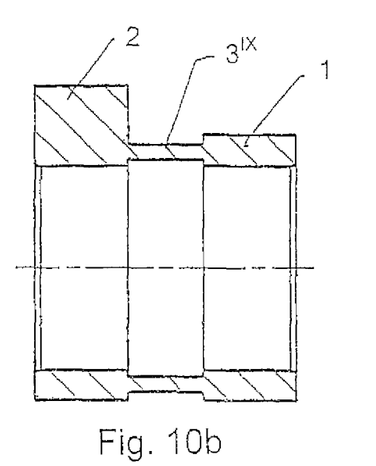
Figure 10C:
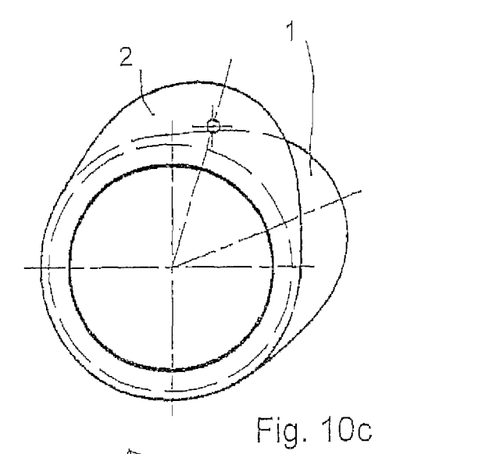

FIGS. 10a, 10b, and 10c

In this embodiment, the carrier pipe $3^{IX}$ is a fixed part of the individual cams 1, 2. This multiple cam may be originally shaped in this form, reshaped or manufactured by machining. The radial inside circumference of the carrier $3^{IX}$ has a slightly enlarged inside diameter in comparison with the adjacent individual cams 1, 2. This area having an enlarged inside diameter offers the advantages already discussed in conjunction with a carrier pipe 3 having a similarly enlarged inside circumference in the embodiment according to FIGS. 3a, 3b, and 3c.

Figure 3D:
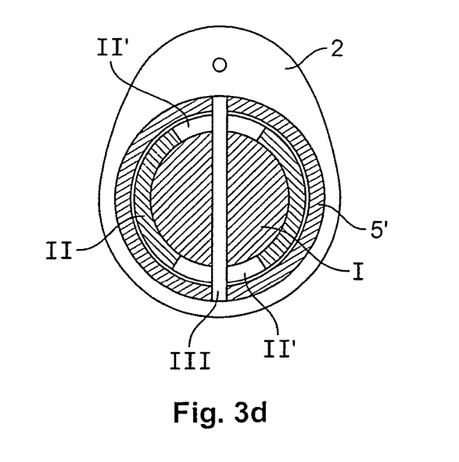

FIG. 3d shows an adjustable camshaft which comprises an inner shaft I and an outer shaft II. The inner shaft I is pinned to the ring collar 5' connected to the cam(s) 2. The respective pin III extends thereby through slot like holes II' in the outer shaft II so the inner shaft and the ring collar 5' with the cam(s) are jointly rotatable for an adjustment in relation to the outer shaft II. This camshaft comprises a radical gap between the outside circumference of the outer shaft II and the inside circumference of the collar 5'. So a manufacturing-related burr on the inside circumference of the ring collar 5' cannot have an interfering effect on the radial bores in the ring collar 5' through which the pinning may be accomplished.

All the features described in the description and characterized in the following claims may be essential to the invention either when used individually or combined together in any form.

The invention claimed is:

1. An assembly comprising the combination of
a multiple cam with a variable camshaft,
said variable camshaft having a hollow shaft (II) to which first cams (1,2) are fixed and about which the multiple cam is free to rotate, an inner control shaft (I) axially passing through the hollow shaft (II), and a connecting pin (III) passing with clearance through a radial aperture (II')in the hollow shaft (II) to couple the multiple cam with the control shaft (I),
said multiple cam having two neighboring individual cams (1,2)and carrier pipe (3") fixed with its axial ends to the two neighboring cams (1,2)and connected within an intermediate section (5')between said individual cams to the connecting pin (III)
wherein the carrier pipe (3") has a larger interior diameter in its intermediate section (5")in comparison to the axial ends, and
a manufacturing-related burr on the inside circumference of the intermediate section, and wherein the intermediate section having radial bores accommodating the connecting pin (III), the larger interior diameter avoiding any interfering or frictional contact of the outer circumference of the hollow shaft with said manufacturing-related burr on the inside circumference of the intermediate section caused by assembling the connecting pin.

* * * * *